(12) United States Patent
Tomihisa

(10) Patent No.: US 11,093,189 B2
(45) Date of Patent: Aug. 17, 2021

(54) PRINTING APPARATUS, METHOD FOR CONTROLLING PRINTING APPARATUS, AND STORAGE MEDIUM FOR PRINTING ACCORDING TO SPECIFIED PRINT TIME

(71) Applicant: CANON KABUSHIKI KAISHA, Tokyo (JP)

(72) Inventor: Taishi Tomihisa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/151,135

(22) Filed: Oct. 3, 2018

(65) Prior Publication Data
US 2019/0107985 A1  Apr. 11, 2019

(30) Foreign Application Priority Data
Oct. 5, 2017  (JP) .............................. JP2017-195482

(51) Int. Cl.
G06F 3/12  (2006.01)

(52) U.S. Cl.
CPC .......... G06F 3/1263 (2013.01); G06F 3/1203 (2013.01); G06F 3/1205 (2013.01); G06F 3/1238 (2013.01); G06F 3/1254 (2013.01); G06F 3/1267 (2013.01); G06F 3/1274 (2013.01); G06F 3/1222 (2013.01); G06F 3/1268 (2013.01)

(58) Field of Classification Search
None
See application file for complete search history.

(56) References Cited

U.S. PATENT DOCUMENTS

| | | | | |
|---|---|---|---|---|
| 5,754,744 A | * | 5/1998 | Matsumoto | G06F 3/1297 358/1.13 |
| 7,710,584 B2 | * | 5/2010 | Teranoshita | H04N 1/00188 358/1.1 |
| 2002/0163666 A1 | * | 11/2002 | Iwata | G06F 3/1205 358/1.15 |
| 2004/0145768 A1 | * | 7/2004 | Stringham | G06K 15/00 358/1.14 |
| 2008/0170254 A1 | * | 7/2008 | Shah | G06F 3/1204 358/1.15 |
| 2010/0214602 A1 | * | 8/2010 | Moriwaki | G03G 15/553 358/1.15 |
| 2013/0063774 A1 | * | 3/2013 | Nuggehalli | G06F 3/1298 358/1.15 |

FOREIGN PATENT DOCUMENTS

JP  2000-351254 A  12/2000

\* cited by examiner

*Primary Examiner* — Thomas D Lee
(74) *Attorney, Agent, or Firm* — Canon U.S.A., Inc. IP Division

(57) ABSTRACT

A printing apparatus displays a list of pieces of print data having specified print times in order of arrangement determined based on the print times of the respective pieces of print data.

12 Claims, 21 Drawing Sheets

FIG.9

| JOB NAME | JOB ID | REGISTRATION DATE AND TIME | PRINT START DATE AND TIME | USERNAME | PRINT SETTINGS |
|---|---|---|---|---|---|
| DOCUMENT A | 100 | 2016/6/1 10:00 | 2016/6/1 12:00 | UserA | 2 COPIES, COLOR, TWO-SIDED |
| DOCUMENT B | 101 | 2016/6/1 10:01 | 2016/6/1 12:20 | UserA | 1 COPY, MONOCHROME, ONE-SIDED |
| SUBMITTED MATERIAL 1 | 102 | 2016/6/1 10:02 | 2016/6/1 12:00 | Admin | 5 COPIES, COLOR, ONE-SIDED |
| MATERIAL A | 103 | 2016/6/1 10:03 | 2016/6/1 12:00 | UserA | 1 COPY, COLOR, TWO-SIDED |
| EXPLANATORY MATERIAL 1 | 104 | 2016/6/1 10:05 | 2016/6/1 12:20 | UserB | 1 COPY, COLOR, ONE-SIDED |
| DOCUMENT C | 105 | 2016/6/1 10:05 | 2016/6/1 12:20 | Guest | 1 COPY, COLOR, TWO-SIDED |
| EXPLANATORY MATERIAL 1 | 106 | 2016/6/1 10:05 | 2016/6/1 12:20 | UserB | 1 COPY, COLOR, ONE-SIDED |

| USER ID | USERNAME | USER AUTHORITY |
|---------|----------|----------------|
| 001 | Admin | Administrator |
| 002 | Guest | Guest |
| 003 | UserA | General |
| 004 | UserB | General |

*1001*  *1002*  *1003*

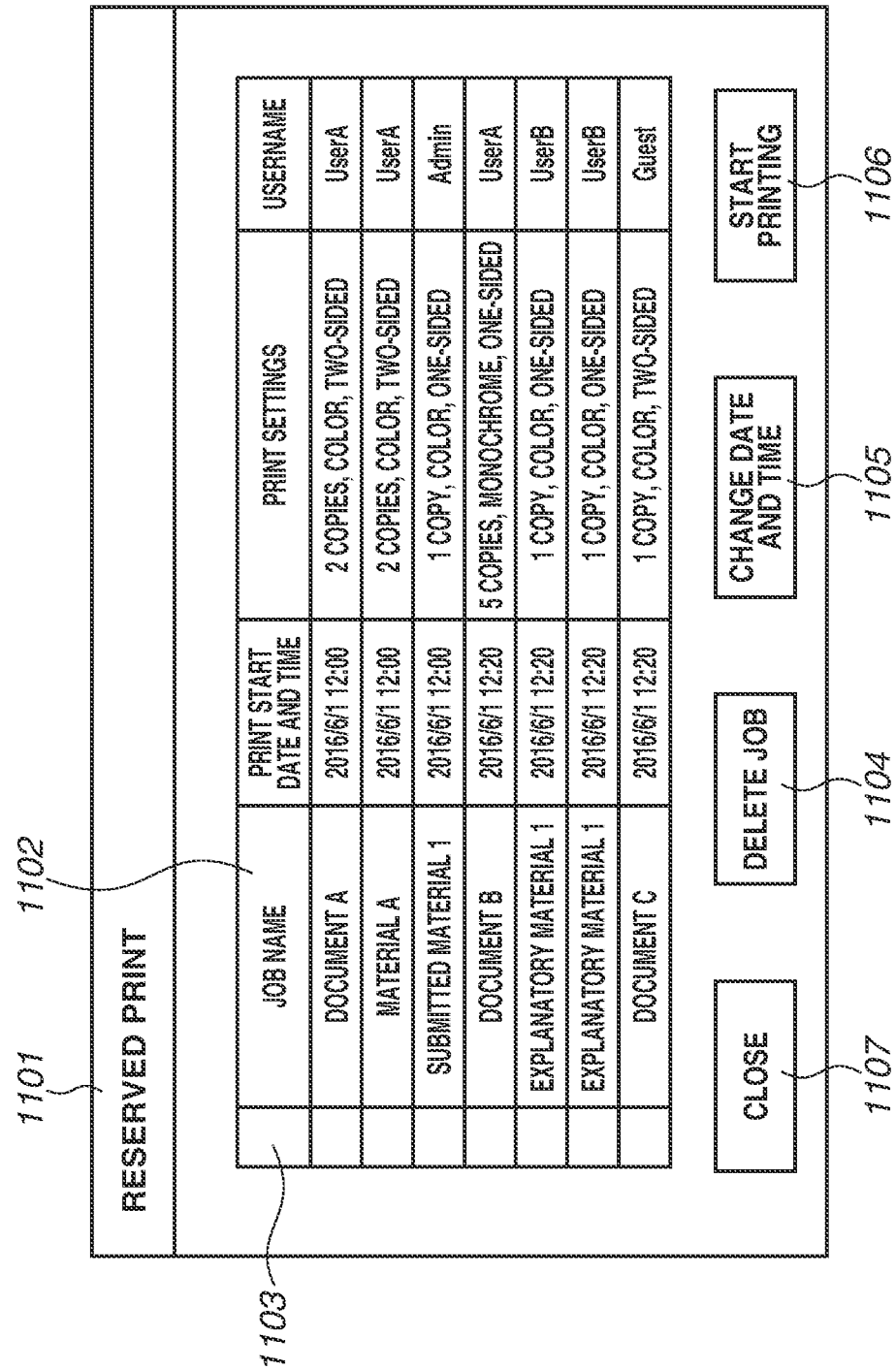

FIG.12

| JOB ID | A | B | C | D | E |
|--------|---|---|---|---|---|
| 100 | 1 | 2 | 2 | 1 | 1 |
| 101 | 4 | 5 | 4 | 4 | 4 |
| 102 | 2 | 1 | 1 | 3 | 2 |
| 103 | 3 | 3 | 3 | 2 | 3 |
| 104 | 5 | 6 | 5 | 5 | 5 |
| 105 | 6 | 4 | 7 | 7 | 7 |
| 106 | 7 | 7 | 6 | 6 | 6 |

RULE A: IN ORDER OF PRINT START DATE AND TIME > JOB ID
RULE B: IN ORDER OF PRINT START DATE AND TIME > USER ID > JOB ID
RULE C: IN ORDER OF PRINT START DATE AND TIME > USER AUTHORITY > USER ID > JOB ID
RULE D: IN ORDER OF PRINT START DATE AND TIME > HIGHER PRIORITY TO USER WHO SUBMITTED JOB FIRST > JOB ID
RULE E: IN ORDER OF PRINT START DATE AND TIME > HIGHER PRIORITY TO JOBS HAVING SAME FILENAME > JOB ID

FIG.13

| JOB NAME / 901 | JOB ID / 902 | REGISTRATION DATE AND TIME / 903 | PRINT START DATE AND TIME / 904 | USERNAME / 905 | PRINT SETTINGS / 906 | PROCESSING ORDER / 1301 |
|---|---|---|---|---|---|---|
| DOCUMENT A | 100 | 2016/6/1 10:00 | 2016/6/1 12:00 | UserA | 2 COPIES, COLOR, TWO-SIDED | 1 |
| DOCUMENT B | 101 | 2016/6/1 10:01 | 2016/6/1 12:20 | UserA | 1 COPY, MONOCHROME, ONE-SIDED | 4 |
| SUBMITTED MATERIAL 1 | 102 | 2016/6/1 10:02 | 2016/6/1 12:00 | Admin | 5 COPIES, COLOR, ONE-SIDED | 3 |
| MATERIAL A | 103 | 2016/6/1 10:03 | 2016/6/1 12:00 | UserA | 1 COPY, COLOR, TWO-SIDED | 2 |
| EXPLANATORY MATERIAL 1 | 104 | 2016/6/1 10:05 | 2016/6/1 12:20 | UserB | 1 COPY, COLOR, ONE-SIDED | 5 |
| DOCUMENT C | 105 | 2016/6/1 10:05 | 2016/6/1 12:20 | Guest | 1 COPY, COLOR, TWO-SIDED | 7 |
| EXPLANATORY MATERIAL 1 | 106 | 2016/6/1 10:05 | 2016/6/1 12:20 | UserB | 1 COPY, COLOR, ONE-SIDED | 6 |

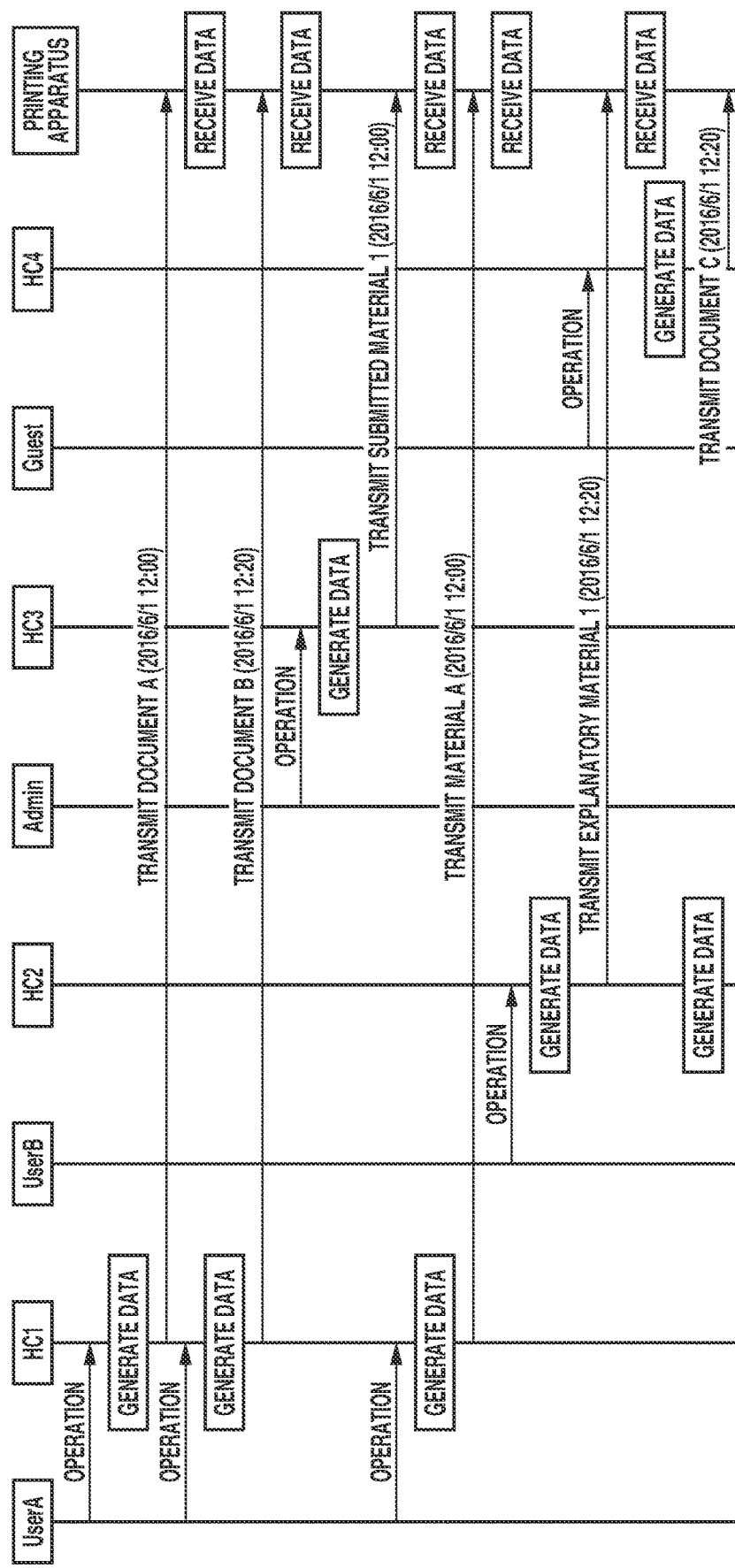

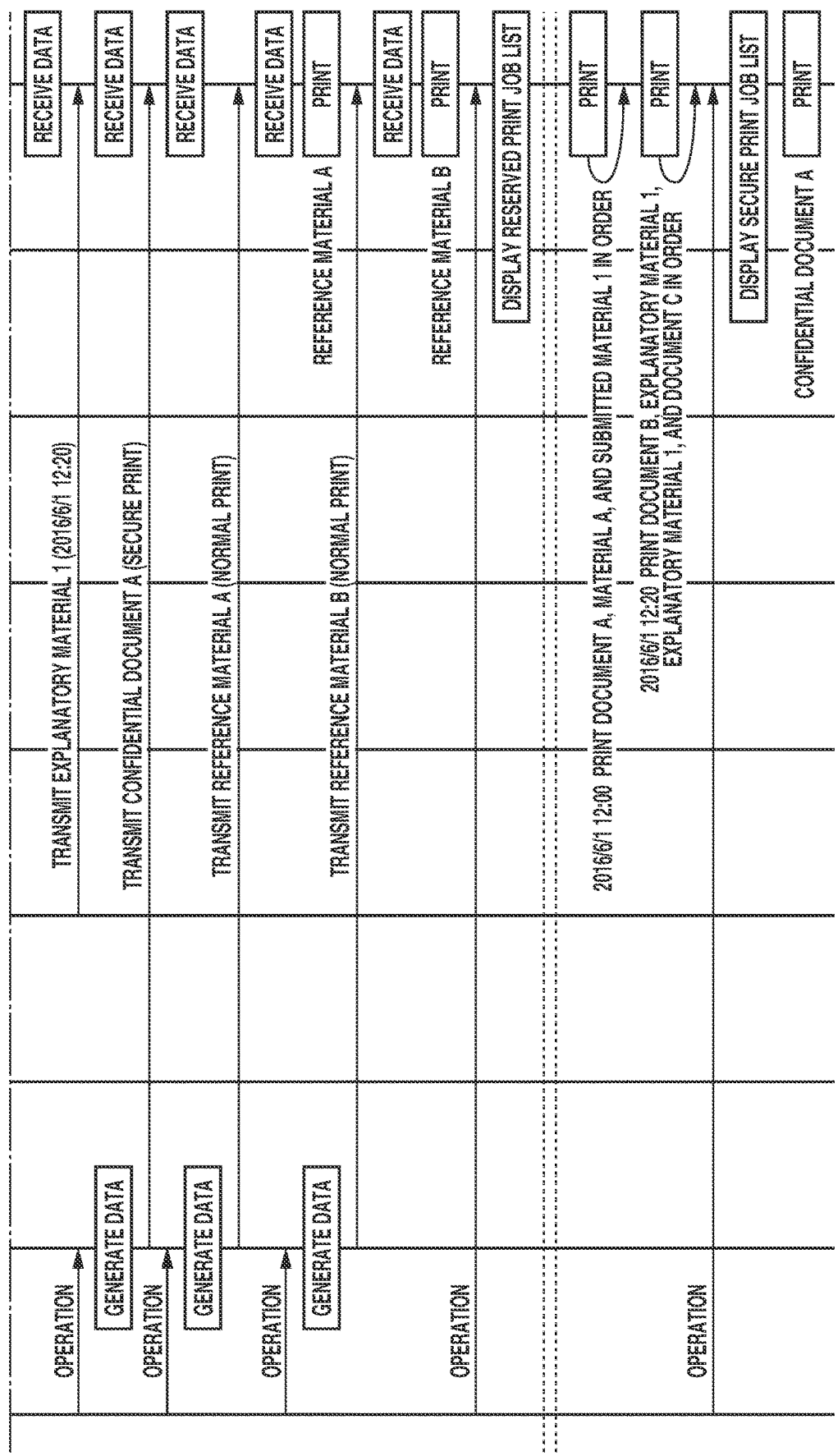

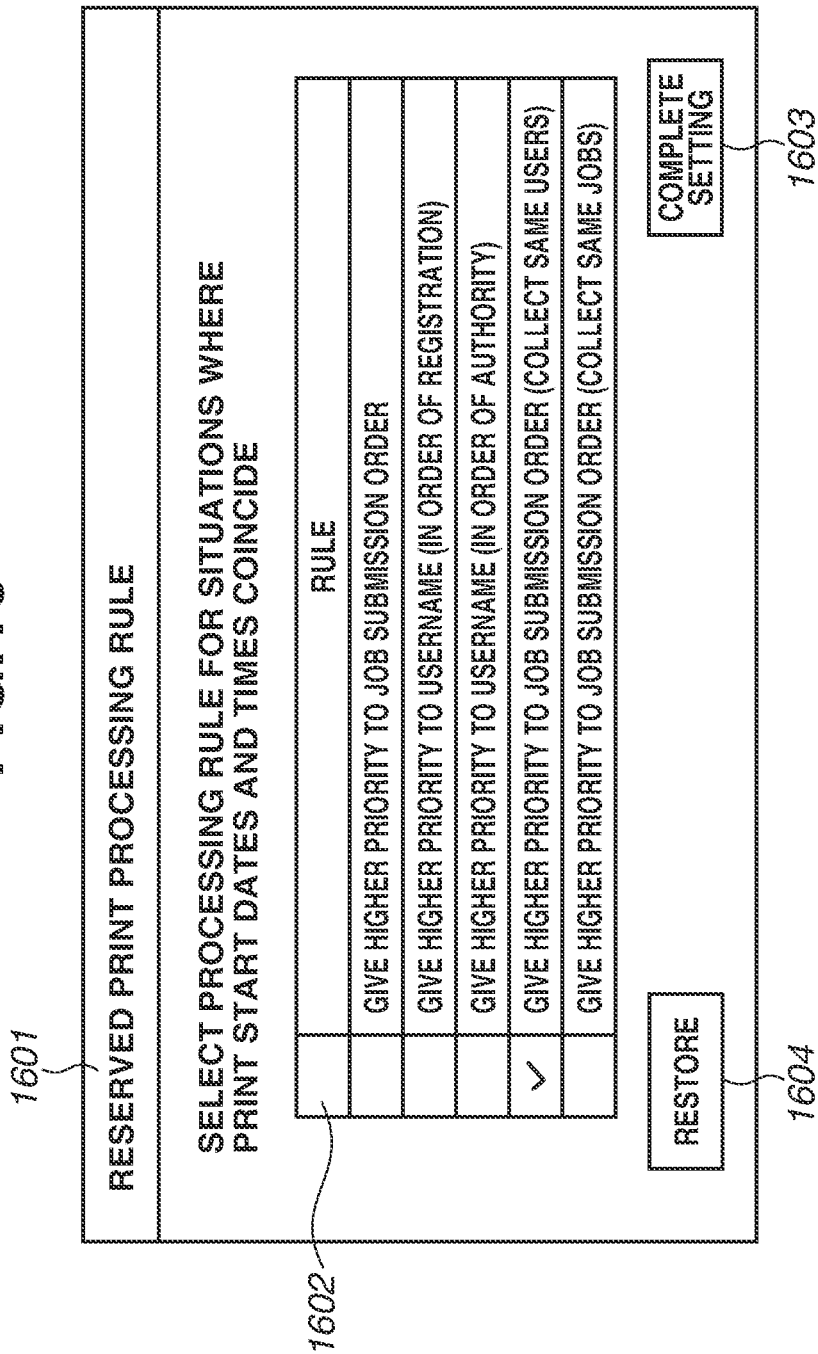

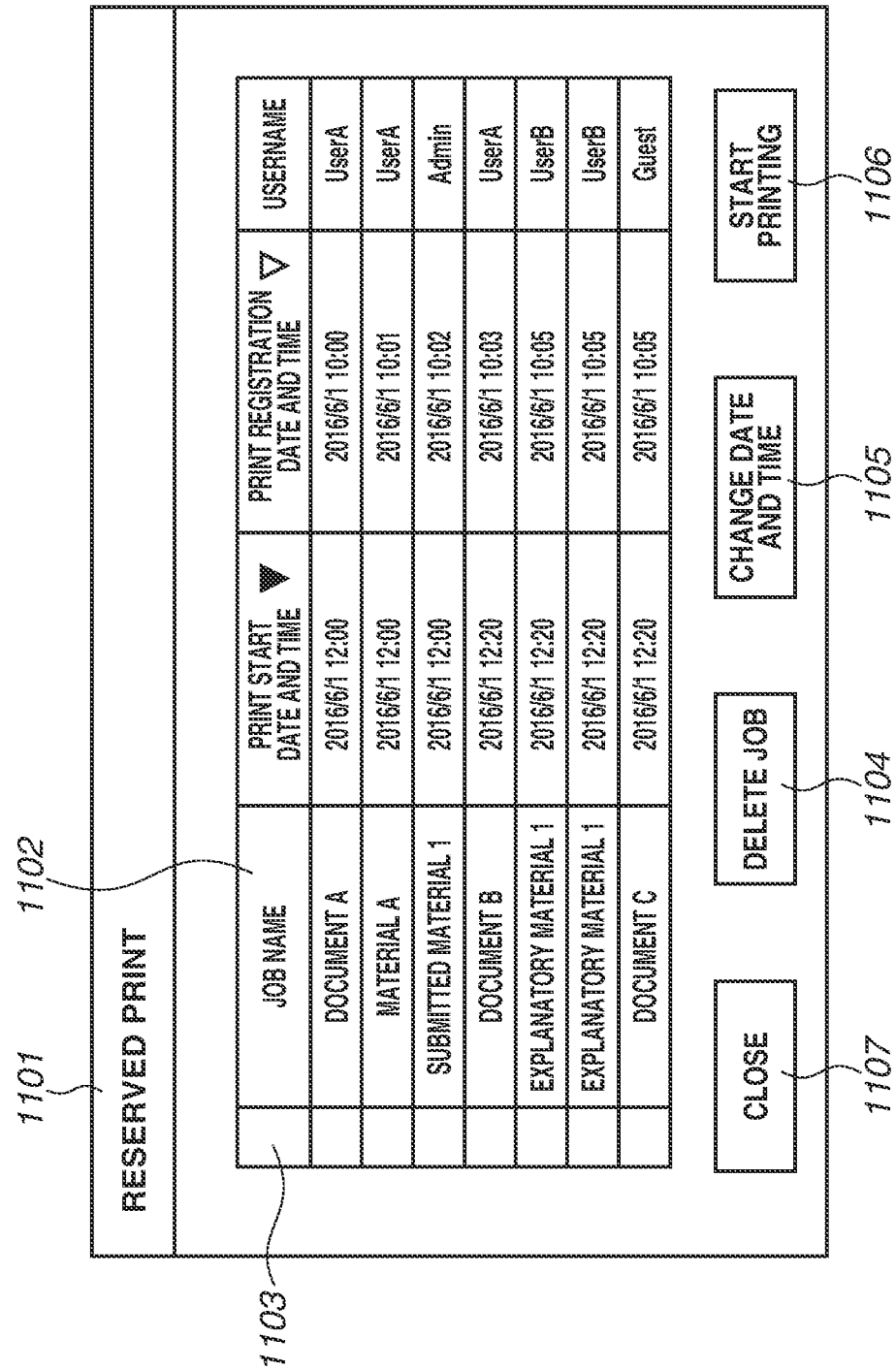

FIG.19

INTEGRATED PRINT JOB LIST

| STATUS | JOB NAME | PRINT START DATE AND TIME | PRINT SETTINGS | USERNAME |
|---|---|---|---|---|
| PRINTING | REFERENCE MATERIAL A | 2016/6/1 11:50 | 1 COPY, COLOR, TWO-SIDED | UserA |
| WAITING FOR PRINTING | REFERENCE MATERIAL B | 2016/6/1 11:51 | 1 COPY, MONOCHROME, ONE-SIDED | UserA |
| RESERVED | DOCUMENT A | 2016/6/1 12:00 | 2 COPIES, COLOR, TWO-SIDED | UserA |
| RESERVED | MATERIAL A | 2016/6/1 12:00 | 2 COPIES, COLOR, TWO-SIDED | UserA |
| RESERVED | SUBMITTED MATERIAL 1 | 2016/6/1 12:00 | 1 COPY, COLOR, ONE-SIDED | Admin |
| RESERVED | DOCUMENT B | 2016/6/1 12:20 | 5 COPIES, MONOCHROME, ONE-SIDED | UserA |
| RESERVED | EXPLANATORY MATERIAL 1 | 2016/6/1 12:20 | 1 COPY, COLOR, ONE-SIDED | UserB |
| RESERVED | EXPLANATORY MATERIAL 1 | 2016/6/1 12:20 | 1 COPY, COLOR, ONE-SIDED | UserB |
| RESERVED | DOCUMENT C | 2016/6/1 12:20 | 1 COPY, COLOR, TWO-SIDED | Guest |
| SECURE | CONFIDENTIAL DOCUMENT A | .... | 1 COPY, COLOR, ONE-SIDED | UserA |

CLOSE

DELETE JOB

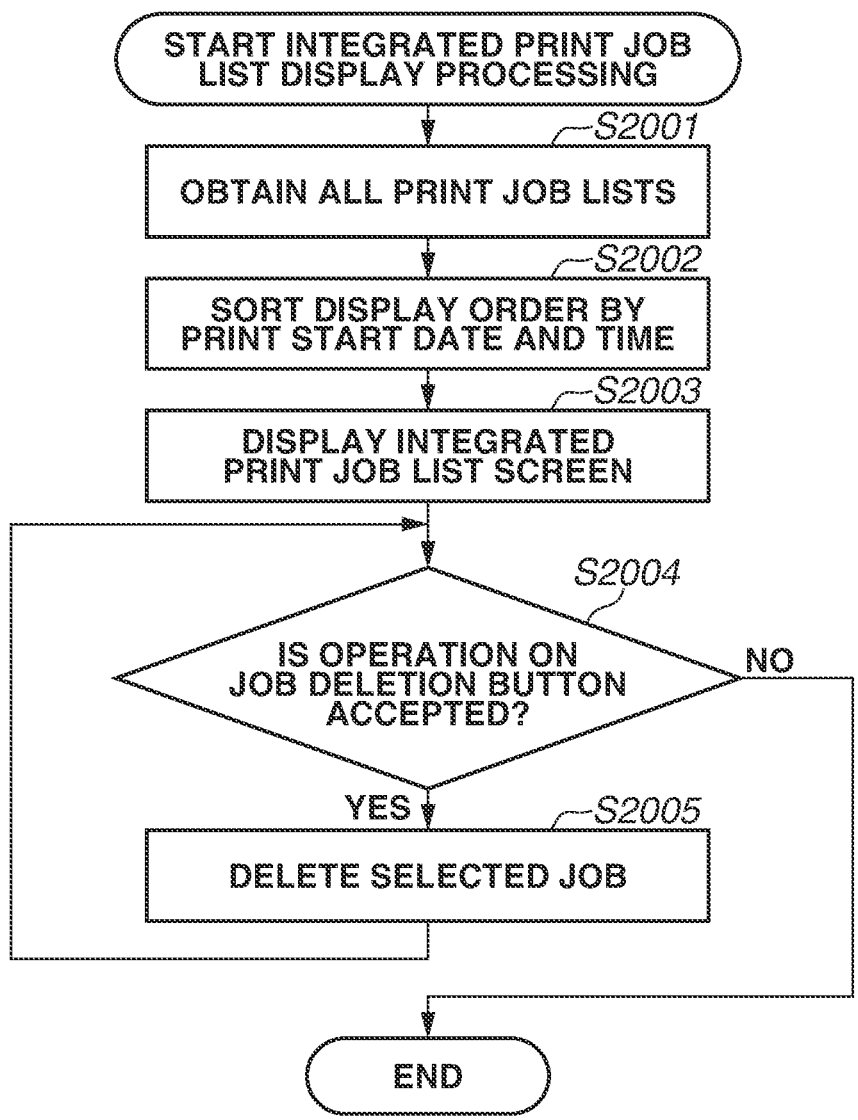

PRINTING APPARATUS, METHOD FOR CONTROLLING PRINTING APPARATUS, AND STORAGE MEDIUM FOR PRINTING ACCORDING TO SPECIFIED PRINT TIME

BACKGROUND OF THE INVENTION

Field of the Invention

The present invention relates to a printing apparatus, a method for controlling a printing apparatus, and a storage medium.

Description of the Related Art

As network environments become prevalent in recent years, shared use of a plurality of image forming apparatuses by a plurality of users is becoming a common practice.

In such an environment, if a specific user occupies an image forming apparatus by making large volumes of print output, the other users are unable to use the image forming apparatus and their operations can be affected. Then, to make a print output in a time period when the use frequencies of the image forming apparatuses are low, a technique "reserved print" for specifying a print start time for a print job and thereby starting a print output at the specified time has been discussed (Japanese Patent Application Laid-Open No. 2000-351254).

Japanese Patent Application Laid-Open No. 2000-351254 does not include a discussion about handling of a plurality of reserved print jobs or an operation on a reserved print job already input. Listing reserved print jobs in order of acceptance has a problem that the starting order of printing is difficult for the user to understand.

SUMMARY OF THE INVENTION

Embodiments of the present invention are directed to enabling the user to easily identify the starting order of printing in a printing apparatus which receives print data having a specified print time from an external apparatus and performs printing based on the print data according to the specified print time.

According to embodiments of the present invention, a printing apparatus includes a reception unit configured to receive print data having a specified print time from an external apparatus, a storage unit configured to store the print data received by the reception unit and having the specified print data, and a control unit configured to perform control so that printing based on the print data stored in the storage unit is performed according to the print time of the print data, the printing apparatus further including a display control unit configured to display a list of a plurality of pieces of print data stored in the storage unit, wherein the display control unit displays the list in order of arrangement determined based on a print time of each piece of print data.

Further features of the present invention will become apparent from the following description of exemplary embodiments with reference to the attached drawings.

BRIEF DESCRIPTION OF THE DRAWINGS

FIG. 9 illustrates an example of a reserved print job list according to the first exemplary embodiment of the present invention.

FIG. 10 illustrates an example of a user list according to the first, second, and third exemplary embodiments of the present invention.

FIG. 11 illustrates an example of a reserved print job list screen according to the first, second, and third exemplary embodiments of the present invention.

FIG. 12 illustrates an example of processing order of display and printing according to the first exemplary embodiment of the present invention.

FIG. 13 illustrates an example of a reserved print job list according to the second exemplary embodiment of the present invention.

FIG. 15, consisting of FIGS. 15A and 15B, is a sequence diagram illustrating a series of processes according to the first, second, and third exemplary embodiments of the present invention.

FIG. 16 illustrates an example of a reserved print processing rule setting screen according to the first, second, and third exemplary embodiments of the present invention.

FIG. 18 illustrates an example of the resented print job list according to the first and second exemplary embodiments of the present invention.

FIG. 19 illustrates an example of an integrated print job list display screen according to the third exemplary embodiment of the present invention.

FIG. 20 is a flowchart illustrating display processing of the integrated print job list according to the third exemplary embodiment of the present invention.

DESCRIPTION OF THE EMBODIMENTS

Figure 1:
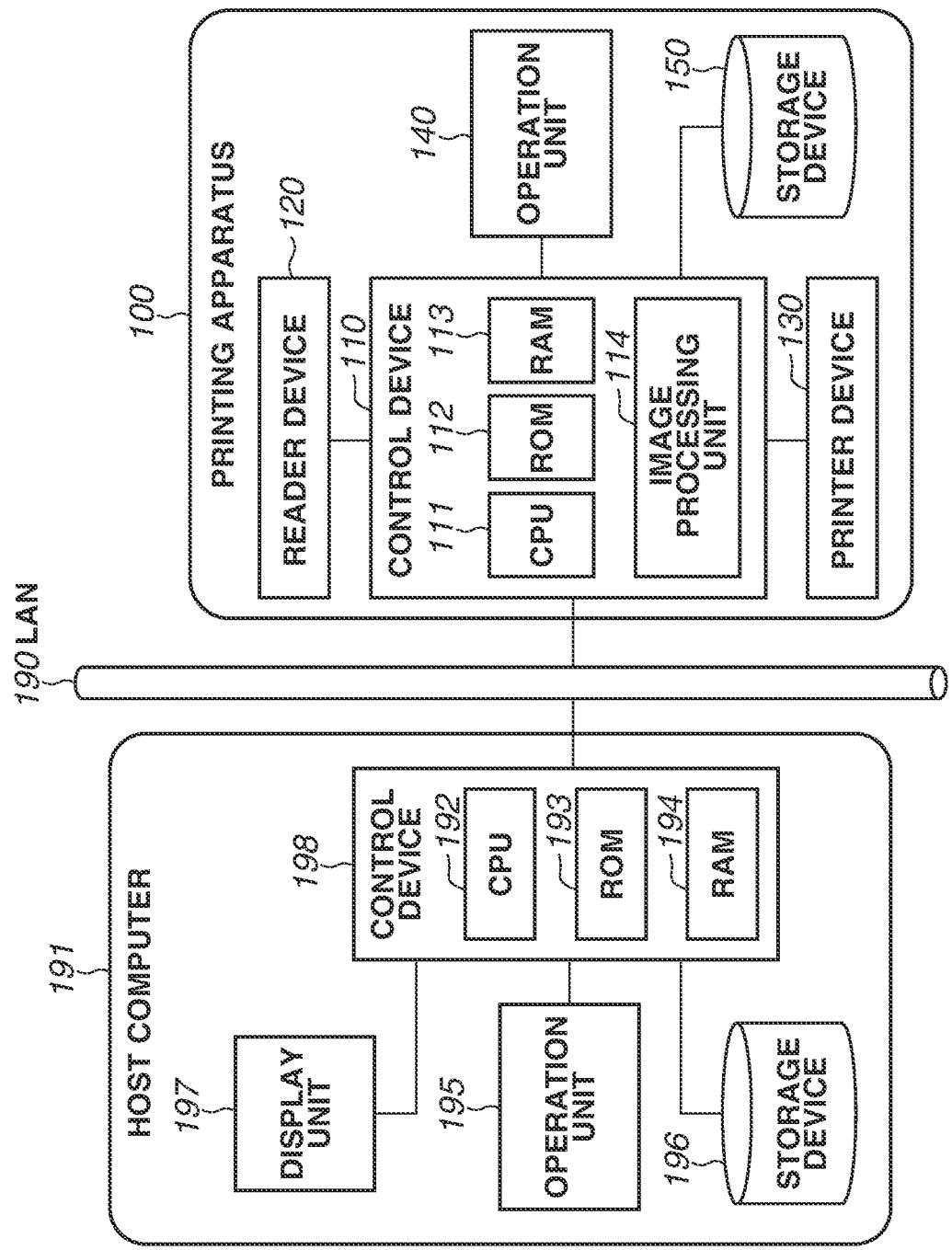
FIG. 1 is a block diagram illustrating a configuration of a printing system according to an exemplary embodiment of the present invention.

Exemplary embodiments of the present invention will be described in detail below with reference to the accompanying drawings.

The following exemplary embodiments are not intended to limit the present invention set forth in the claims, and all combinations of features described in the present exemplary embodiments are not necessarily indispensable to solving means of the present invention. Similar components will be designated by the same reference numerals, and a description thereof will be omitted.

<Overview of Printing System>

FIG. 1 is a diagram illustrating a configuration of a printing system. As illustrated in FIG. 1, the printing system includes a printing apparatus 100 and a host computer (HC) 191. In the present exemplary embodiment, a multifunction printer (MFP) in which a plurality of functions such as a print function, a reading function, and a facsimile (FAX) function is integrated will be described to be used as the printing apparatus 100. However, printers of other configurations, such as a single function printer (SFP) and a laser beam printer (LBP), may be used. The printing apparatus 100 and the HC 191 are mutually communicably connected via a network 190 such as a local area network (LAN). A plurality of printing apparatuses and a plurality of HCs may be connected with each other. Servers and other apparatuses may be connected. The network 190 may be configured as a wired network, a wireless network, or a combination of these.

The printing apparatus 100 includes a control device 110, a reader device 120, a printer device 130, an operation unit 140, and a storage device 150. The control device 110 is a control substrate (controller) which controls the printing apparatus 100 in a centralized manner. The control device 110 includes a central processing unit (CPU) 111, a read-only memory (ROM) 112, a random access memory (RAM) 113, and an image processing unit 114.

The CPU 111 controls the blocks in the control device 110 via a not-illustrated system bus. For example, the CPU 111 performs functions of the printing apparatus 100 by reading and executing programs stored in the ROM 112, the RAM 113, the storage device 150, or other storage media. For example, the CPU 111 controls reading of an image by the reader device 120, printing by the printer device 130, and display of an image on the operation unit 140. The ROM 112 stores, for example, control programs, and tables and setting data needed to perform the functions of the printing apparatus 100. The RAM 113 is used, for example, as a work memory of the CPU 111.

The image processing unit 114 performs various types of image processing, such as conversion, correction, editing, and compression/decompression, on image data generated by reading an image on a document by the reader device 120 or image data received from an external apparatus. The image processing unit 114 may be configured by hardware or implemented by software. The storage device 150 stores, for example, image data, device information such as a mode and a license, and user information such as an address book and customization information. The reader device 120 includes a configuration of a scanner engine. The reader device 120 optically reads a document set on a not-illustrated document positioning plate or fed from an automatic document feeder (ADF), and generates image data. The printer device 130 includes a configuration of a printer engine corresponding to various recording methods such as an inkjet recording method and an electrophotographic method, and forms an image on a recording medium. The operation unit 140 includes operation keys for accepting a user's operations, and a liquid crystal panel for displaying various settings and a user interface screen. The operation unit 140 outputs information about accepted user operations to the control device 110. The printing apparatus 100 is not limited to the configuration illustrated in FIG. 1, and includes other configurations according to functions that can be performed by the printing apparatus 100. For example, the printing apparatus 100 may include a configuration needed to perform a FAX function and a configuration that enables short-range wireless communication.

The HC 191 includes a control device 198, an operation unit 195, a storage device 196, and a display unit 197. The control device 198 is a control substrate (controller) which controls the HC 191 in a centralized manner. The control device 198 includes a CPU 192, a ROM 193, and a RAM 194. The CPU 192 controls the blocks in the control device 198 via a system bus (not illustrated). For example, the CPU 192 performs functions of the HC 191 by reading and executing programs stored in the ROM 193, the RAM 194, or other storage media. The ROM 193 stores, for example, various control programs, such as an operation system (OS) program, and tables and setting data needed to perform the functions of the HC 191. The RAM 194 is used, for example, as a work memory of the CPU 192. The storage device 196 stores, for example, various application programs, data, user information, and device information. The operation unit 195 includes a keyboard and a pointing device for accepting a user's operations. The operation unit 195 outputs information about accepted user operations to the control device 198. The display unit 197 is a liquid crystal display, for example. The display unit 197 displays various user interface screens and information.

Specific exemplary embodiments will be described below by using the printing system having the foregoing configuration as an example.

A first exemplary embodiment will be described below. FIGS. 15A and 15B, hereinafter collectively referred to as FIG. 15, is a sequence diagram illustrating a flow of processing of users, HCs 191, and the printing apparatus 100 according to the present exemplary embodiment. Here, an example in which user A uses HC 1, user B uses HC 2, an administrator uses HC 3, and a guest user uses HC 4 to transmit print data to the printing apparatus 100 will be described. HCs 1 to 4 have the same configuration as that of the HC 191. FIG. 15 illustrates an example in which processing is performed in the following order:

(1) User A generates a reserved print job of document A (print start date and time: 2016/6/1 12:00) by using HC 1, and transmits the reserved print job to the printing apparatus 100.

(2) User A generates a reserved print job of document B (print start date and time: 2016/6/1 12:20) by using HC 1, and transmits the reserved print job to the printing apparatus 100, (3) The administrator generates a reserved print job of submitted material 1 (print start date and time: 2016/6/1 12:00) by using HC 3, and transmits the reserved print job to the printing apparatus 100.

(4) User A generates a reserved print job of material A (print start date and time: 2016/6/1 12:00) by using HC 1, and transmits the reserved print job to the printing apparatus 100.

(5) User B generates a reserved print job of explanatory material 1 (print start date and time: 2016/6/1 12:20) by using HC 2, and transmits the reserved print job to the printing apparatus 100.

(6) The guest user generates a reserved print job of document C (print start date and time: 2016/6/1 12:20) by using HC 4, and transmits the reserved print job to the printing apparatus 100.

(7) User B generates a reserved print job of explanatory material 1 (print start date and time: 2016/6/1 12:20) by using HC 2, and transmits the reserved print job to the printing apparatus 100.

(8) User A generates a secure print job of confidential document A by using HC 1, and transmits the secure print job to the printing apparatus 100.

(9) User A generates a normal print job of reference material A by using HC 1, and transmits the normal print job to the printing apparatus 100. Receiving the normal print job, the printing apparatus 100 prints reference material A.

(10) User A generates a normal print job of referential material B by using HC 1, and transmits the normal print job to the printing apparatus 100. Receiving the normal print job, the printing apparatus 100 prints reference material B.

(11) User A operates the printing apparatus 100 to display a reserved print job list.

(12) At 2016/6/1 12:00, the printing apparatus 100 prints the reserved print jobs for which the current date and time is specified as the print start date and time, namely, document A, material A, and submitted material 1 in order.

(13) At 2016/6/1 12:20, the printing apparatus 100 prints the reserved print jobs for which the current date and time is specified as the print start date and time, namely, document B, explanatory material 1, explanatory material 1, document C, and explanatory material 1 in order.

(14) User A operates the printing apparatus 100 to display a secure print job list. The user selects confidential document A and inputs a password to print confidential document A.

Figure 2:
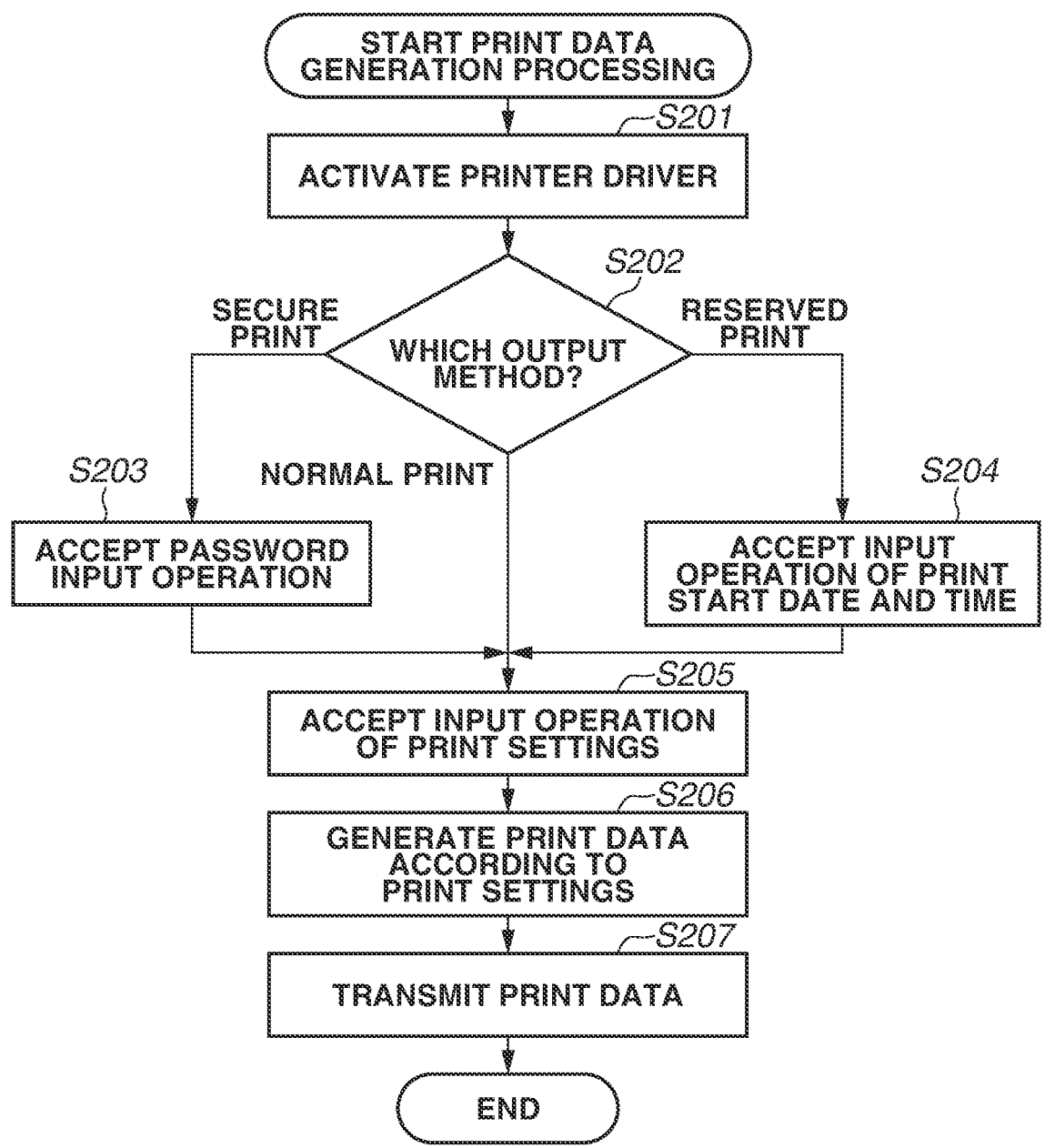
FIG. 2 is a flowchart illustrating a processing procedure of print data generation processing according to first, second, and third exemplary embodiments of the present invention.

Next, print data generation processing, print data reception processing, reserved print job list display processing, and reserved print job print processing will each be described in detail, FIG. 2 is a flowchart illustrating print data generation processing of the HC 191. For example, the processing of FIG. 2 is implemented by the CPU 192 reading a program stored in the ROM 193 into the RAM 194 and executing the program.

In step S201, the CPU 192 accepts a print instruction from a user via an application, and activates a printer driver. Here, the CPU 192 reads initial values of various settings, such as print settings and image processing settings, stored in the ROM 193.

In step S202, the CPU 192 displays a user interface screen of the printer driver on the display unit 197. The user interface screen displays buttons for accepting a selection operation about an output method from the user, and buttons for accepting an input operation of the print settings from the user. Suppose here that any one of normal print, secure print, and reserved print can be selected as the output method. If normal print is selected as the output method (NORMAL PRINT in step S202), the processing proceeds to step S205. If secure print is selected (SECURE PRINT in step S202), the processing proceeds to step S203. If reserved print is selected (RESERVED PRINT in step S202), the processing proceeds to step S204.

In step S203, the CPU 192 displays a password input screen of secure print on the display unit 197, and accepts a password input operation from the user.

In step S204, the CPU 192 displays an input screen for a print start date and time of reserved print on the display unit 197, and accepts an input operation of the print start date and time from the user. While a print start date and time is specified here, only a print start time may be specified without specification of the date.

In step S205, the CPU 192 accepts an input operation of the print settings (such as the number of copies, color mode, and two-sided printing) from the user. While the print settings are input here after the determination of the output method, the settings may be made in reverse order.

In step S206, the CPU 192 receives a print command notified from the application via the OS, and generates print data according to various print settings made in step S205. Suppose that information such as user information, a job name, and the output method is set for the generated print data here. If a password is specified in step S203, the print data includes password information. If a print start date and time is specified in step S204, the print data includes information about the print start date and time.

In step S207, the CPU 192 transmits the print data to the printing apparatus 100 via the network 190. The present processing is ended.

Figure 3:
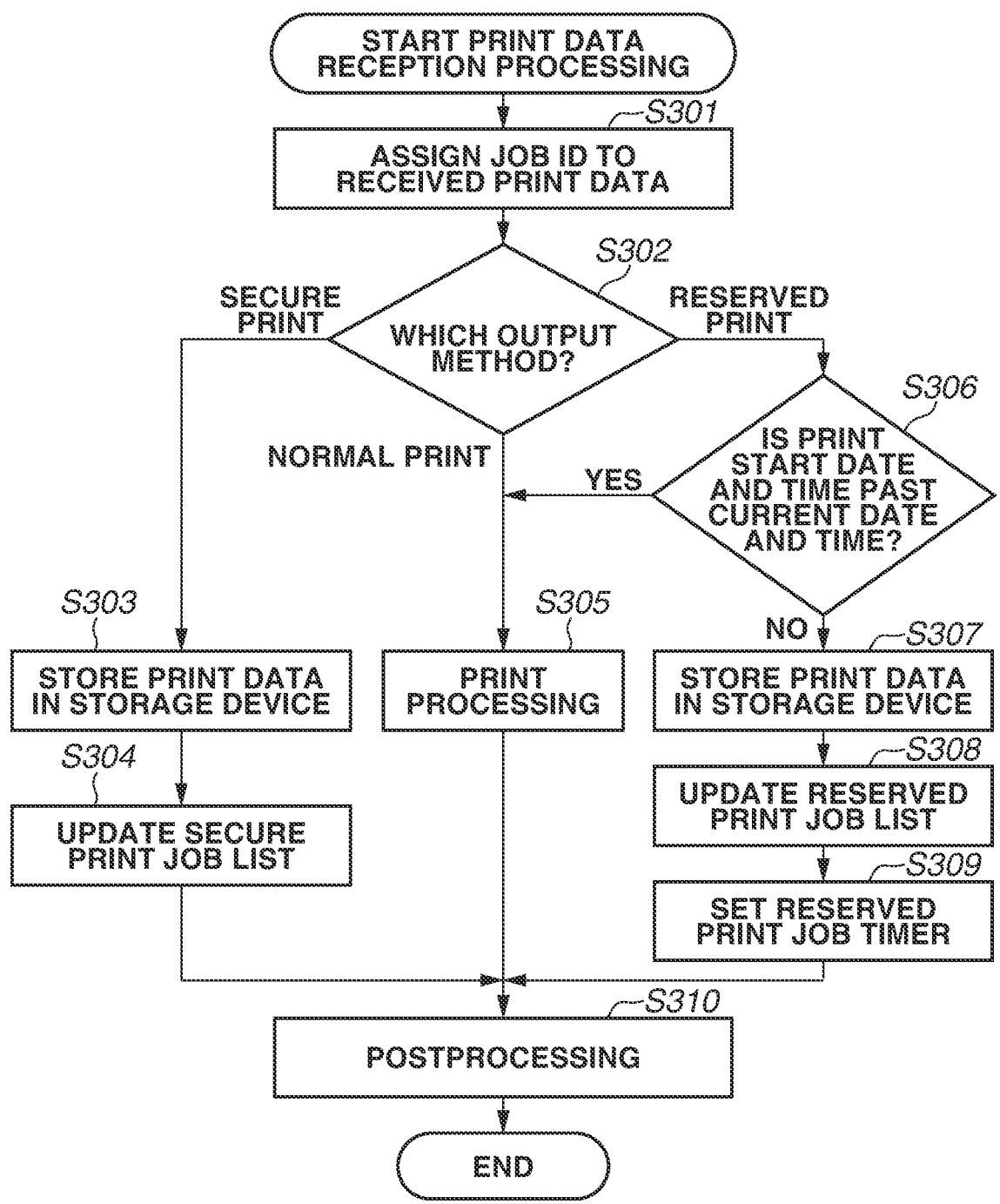
FIG. 3 is a flowchart illustrating a processing procedure of print data reception processing according to the first exemplary embodiment of the present invention.

FIG. 3 is a flowchart illustrating print data reception processing of the printing apparatus 100. For example, the processing of FIG. 3 is implemented by the CPU 111 reading a program stored in the ROM 112 into the RAM 113 and executing the program. The processing of FIG. 3 is started when the printing apparatus 100 receives the print data transmitted from the HC 191 in step S207 of FIG. 2.

In step S301, the CPU 111 assigns a job identifier (ID) to the received print data. Job IDs are sequentially assigned to jobs in order of acceptance, so that the order of reception can be uniquely identified. To obtain information about the print data or wait for processing of a preceding job, the CPU 111 may temporarily store the print data in the RAM 113 or the storage device 150 and perform subsequent processing.

In step S302, the CPU 111 switches processing of the received print data based on the information about the output method set for the print data in step S206. If the output method is normal print (NORMAL PRINT in step S302), the processing proceeds to step S305. If the output method is secure print (SECURE PRINT in step S302), the processing proceeds to step S303. If the output method is reserved print (RESERVED PRINT in step S302), the processing proceeds to step S306.

In step S303, the CPU 111 stores the received print data in the storage device 150.

In step S304, the CPU 111 obtains information about the print data, including a username, a job name, a password, and various print settings, from the print data stored in step S303. The CPU 111 updates the secure print job list based on the obtained information, and stores information about the secure print job list into the storage device 150. During print processing of secure print, the user selects a job from the secure print job list stored here. If the password input by the user coincides with the password set for the job, the print processing is performed. After the end of the print processing, the CPU 111 deletes the job from the secure print job list stored in the storage device 150.

In step S305, the CPU 111 adds the received print data to a print processing execution waiting print job list in the RAM 113, and waits until the processing of a preceding print job ends and the CPU 111 becomes ready to start printing. If the CPU 111 is ready to start printing the print data, the CPU 111 interprets the print data to generate an image, and passes the generated image data to the printer device 130. The printer device 130 performs print processing by forming an image on a recording medium, such as a sheet, based on the received image data. After the end of the print processing, the CPU 111 deletes the information about the print job of the print data from the print processing execution waiting print job list in the RAM 113.

In step S306, the CPU 111 obtains information about the print start date and time from the received print data. The CPU 111 compares the print start date and time with the current date and time managed in the printing apparatus 100 to determine whether the print start date and time is past the current date and time. If the print start date and time is not past the current date and time (NO in step S306), the processing proceeds to step S307. If the print start date and time is past the current date and time (YES in step S306), the processing proceeds to step S305. Alternatively, if the print start date and time is past the current date and time (YES in step S306), the CPU 111 may cancel the job, or may handle the print job as a secure print job without password specification, in which case the processing proceeds to step S303.

In step S307, the CPU 111 stores the received print data in the storage device 150.

In step S308, the CPU 111 obtains the information about the print data, including the username, the job name, the print start date and time, and various print settings, from the print data stored in the storage device 150 in step S307. The CPU 111 updates the reserved print job list based on the obtained information, and stores information about the reserved print job list into the storage device 150.

FIG. 9 illustrates an example of the reserved print job list. The reserved print job list includes information about a job ID 902 which is assigned in step S301, and a job name 901, a print start date and time 904, a username 905, and print settings 906 which are information obtained from print data. A new reserved print job to be additionally registered is registered at the end of the reserved print job list, along with additional information about a registration date and time 903 which is the current date and time upon registration.

In step S309, the CPU 111 sets a reserved print job timer for the earliest print start date and time among those of the reserved print jobs included in the reserved print job list. In the case of the reserved print job list of FIG. 9, the information "2016/6/1 12:00" is set into the reserved print job timer.

In step S310, the CPU 111 performs post-processing, and the present processing is ended. Examples of the post-processing include processing for storing a processing result log in the storage device 150, and processing for clearing temporarily used areas of the RAM 113 and the storage device 150. The CPU 111 here may notify the HC 191 of the completion of the print data reception processing.

Since the triggers to start printing a reserved print job and a secure print job are different from each other, the starting order of printing is not explicitly determinable. The CPU 111 therefore separately manages the reserved print job list and the secure print job list so that the print jobs are not mixed up during display or printing.

Figure 4:
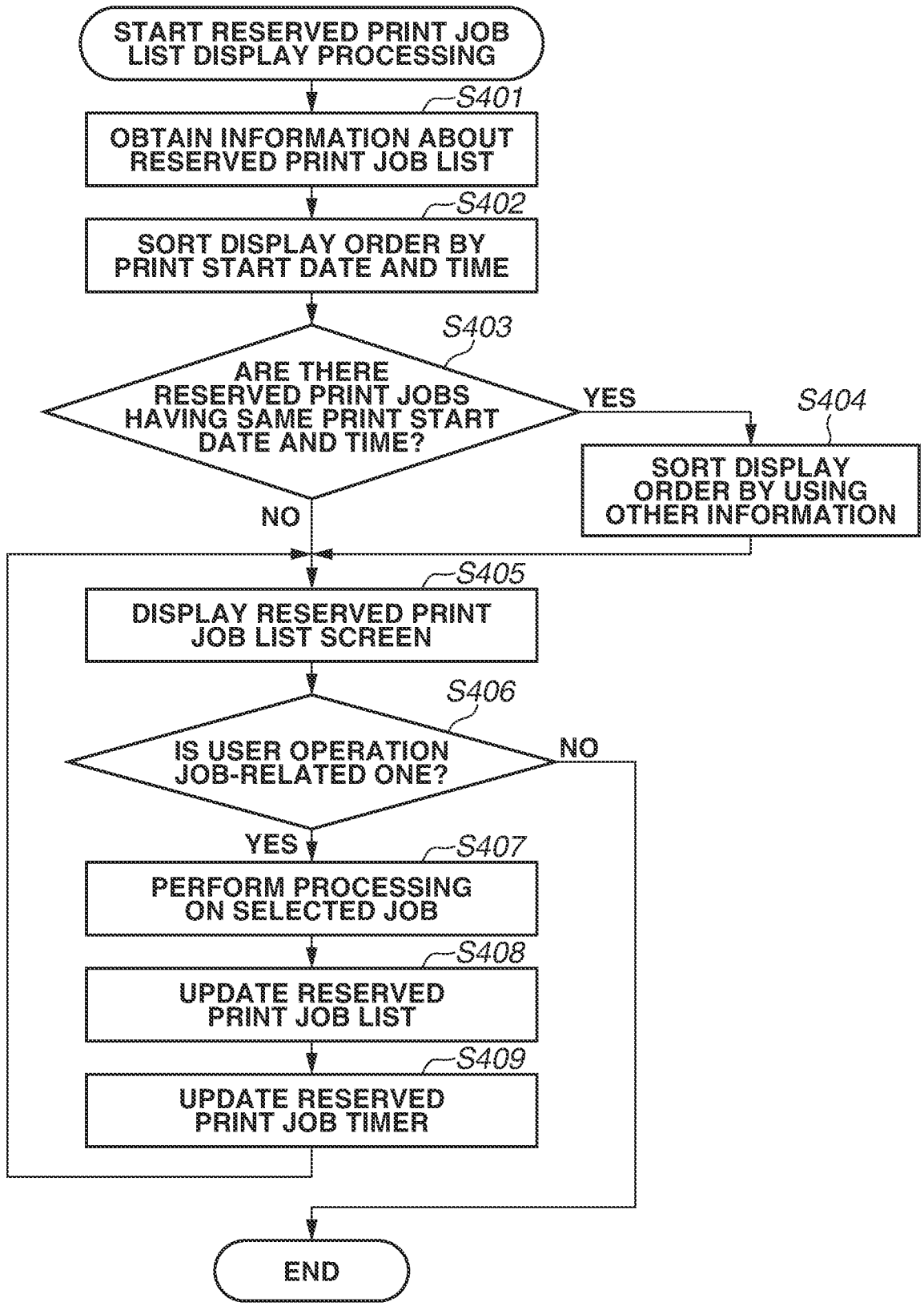
FIG. 4 is a flowchart illustrating a processing procedure of reserved print job list display processing according to the first exemplary embodiment of the present invention.

FIG. 4 is a flowchart illustrating reserved print job list display processing of the printing apparatus 100. For example, the processing of FIG. 4 is implemented by the CPU 111 reading a program stored in the ROM 112 into the RAM 113 and executing the program. The processing of FIG. 4 is started by the user giving an instruction to start this processing via the operation unit 140.

In step S401, the CPU 111 obtains the information about the reserved print job list stored in the storage device 150 in step S308. The following description will be given on the assumption that the information about the reserved print job list of FIG. 9 is obtained here.

In step S402, the CPU 111 sorts display order (order of arrangement) of the reserved print jobs based on the information about the print start dates and times in the reserved print job list obtained in step S401 so that the reserved print jobs of earlier print start dates and times can be displayed first.

In step S403, the CPU 111 determines whether there are reserved print jobs having the same print start date and time. If there are such reserved print jobs (YES in step S403), the processing proceeds to step S404. If not (NO in step S403), the processing proceeds to step S405.

In step S404, the CPU 111 sorts the display order of the reserved print jobs having the same print start date and time according to a set rule by using information other than the print start date and time.

FIG. 10 illustrates a user list. The display order of the reserved print jobs having the same print start date and time can be sorted by using information about the user list. A user ID 1001, a username 1002, and user authority 1003 are registered in the user list. The printing apparatus 100 can identify the user ID 1001 and the user authority 1003 from the username 1002 included in the received print data.

FIG. 12 illustrates the display order of reserved print jobs under application of various rules. Rule A is to process reserved print jobs according to the order of priority of the print start date and time 904 and the job ID 902. As described above, job IDs are assigned in order of reception of print data (order of job registration). Reserved print jobs sorted by the order of job IDs are thus displayed in the order of reception of print data, Rule B is to process reserved print jobs according to the order of priority of the print start date and time 904, the user ID 1001, and the job ID 902. Rule C is to process reserved print jobs according to the order of priority of the print start date and time 904, the user authority 1003 (in the order of priority of administrator, general, and guest), the user ID 1001, and the job ID 902. Rule D is to process reserved print jobs according to the order of priority of the print start date and time 904, converging reserved print jobs of a user having a reserved print job of a lower job ID 902 into the earliest one, and the job ID 902. Rule E is to process reserved print jobs according to the order of priority of the print start date and time 904, converging reserved print jobs having the same job name 901 into the earliest one, and the job ID 902. Rules other than described above may be used as long as the order of priority can be uniquely identified. Which rule to use may be defined in the program, and may be switchable by the user.

FIG. 16 illustrates an example of a reserved print processing rule setting screen which the CPU 111 displays on the liquid crystal panel of the operation unit 140 to accept rule setting operations from the user. The reserved print processing rule setting screen 1601 displays a reserved print processing rule display area 1602, a setting completion button 1603, and a restore button 1604. The reserved print processing rule display area 1602 displays the processing rules for situations where the print start dates and times coincide. The display areas of the respective rules have the role of a selection button for selecting the rules. If the user selects a rule, the corresponding checkbox is checked and display is switched so that the selected rule can be identified. If the user presses the setting completion button 1603, the selected rule is applied. If the user presses the restore button 1604, the immediately previously set rule is applied. The following description will be given on the assumption that the reserved print jobs are processed according to the order of priority of rule D.

In step S405, the CPU 111 displays a reserved print job list screen in which the display order is sorted on the liquid crystal panel of the operation unit 140.

FIG. 11 illustrates an example of the reserved print job list screen. A reserved print job list screen 1101 displays a job display area 1102, checkboxes 1103, a job deletion button 1104, a print start date and time change button 1105, a printing start button 1106, and a close button 1107. The information about the registration dates and times of the reserved print jobs is not displayed here. The job display area 1102 displays information needed for the user to identify the reserved print jobs, such as a job name. The display areas of the items related to the respective reserved print jobs in the job display area 1102 have the role of a selection button for selecting the reserved print jobs. If the user selects a reserved print job, the corresponding checkbox 1103 is checked and display is switched so that the selected reserved print job can be identified.

Figure 17:
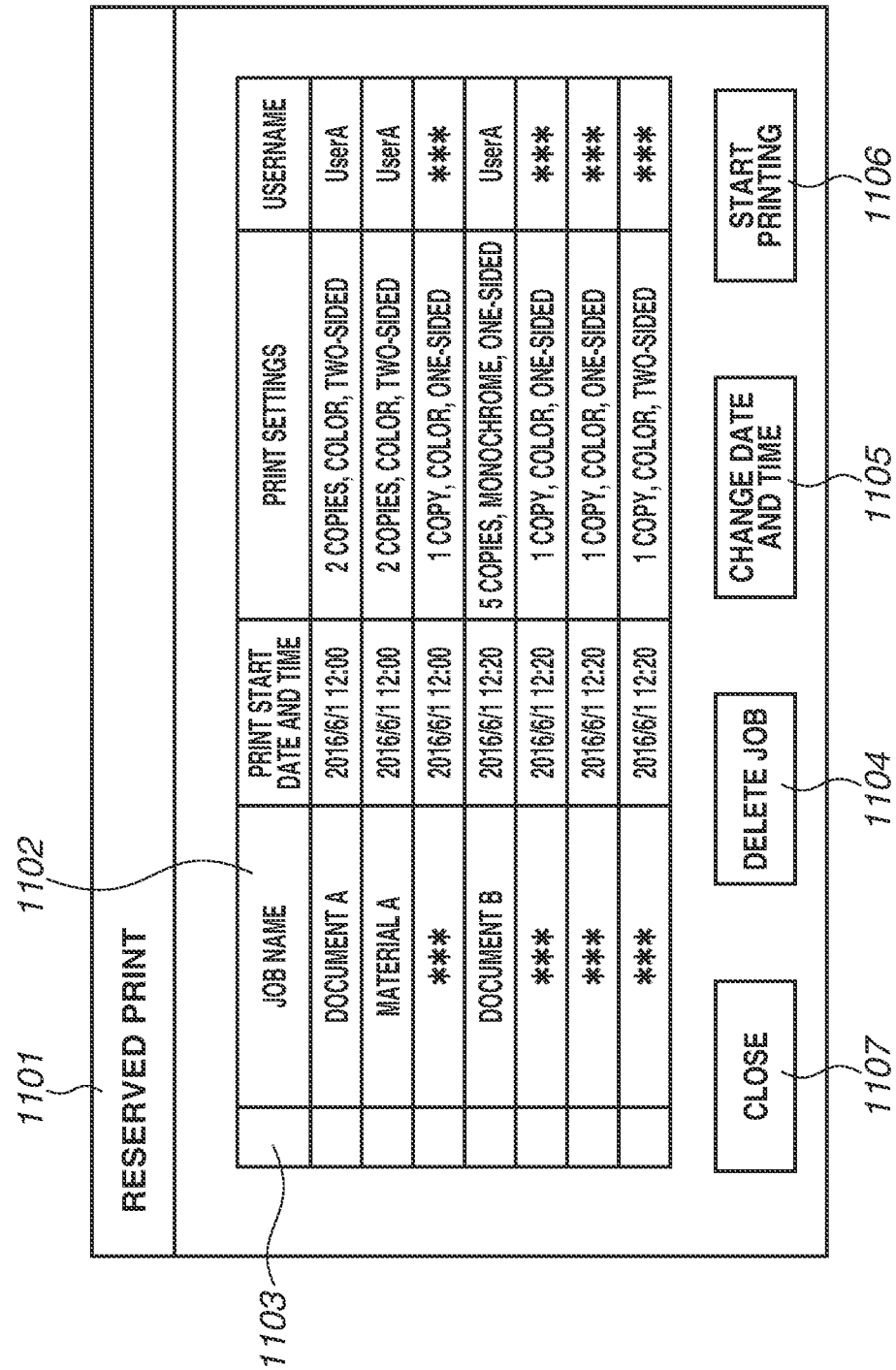
FIG. 17 illustrates an example of an anonymized resented print job list according to the first and second exemplary embodiments of the present invention.

FIG. 18 illustrates another example of the reserved print job list screen. As compared with FIG. 11, information about the registration dates and times (print registration dates and times) of the reserved print jobs is displayed instead of the print settings. Here, a symbol "▼" is displayed to indicate that the reserved print jobs are displayed in order of the print start date and time starting with the earliest start date and time. The order of priority of display here can be switched to display the reserved print jobs in order of the print start date and time starting with the earliest start date and time or in order of the print registration date and time starting with the earliest or latest print registration date and time. The setting about the order of priority of display may be stored printing apparatus by printing apparatus, or may be stored user by user. In the case of a user authentication environment, job names and usernames may be made anonymous (hidden or replaced with specific letters). Only the jobs of the login user may be displayed. FIG. 17 illustrates an example of the display screen of the reserved print job list in which job names and usernames are made anonymous in a case where user A has logged in. In the job display area 1102, the job names and usernames of the reserved print jobs of the users other than user A are displayed as "***".

Return to the description of FIG. 4. In step S406, the CPU 111 accepts an operation from the user via the operation unit 140. If the operation is a job-related one made by the job deletion button 1104, the print start date and time change button 1105, or the printing start button 1106 (YES in step S406), the processing proceeds to step S407. If the operation is one for closing the reserved print job list screen, made by the close button 1107 (NO in step S406), the present processing ends.

In step S407, the CPU 111 performs processing on the selected reserved print job. If the operation is one made by the job deletion button 1104, the CPU 111 deletes the print data on the selected reserved print job from the storage device 150. If the operation is one made by the print start date and time change button 1105, the CPU 111 displays a print start date and time change screen on the operation unit 140, and accepts a change to the print start date and time from the user. If the operation is one made by the printing start button 1106, the CPU 111 interprets the print data read from the storage device 150 to generate an image, and passes the generated image to the printer device 300. The printer device 300 performs print processing of the received image on a print medium such as paper. The CPU 111 deletes the print data of the reserved print job of which the print processing is completed from the storage device 150.

In step S408, the CPU 111 updates the contents of the reserved print job list according to the content of the processing performed in step S407, such as a change of the print start date and time and deletion of the reserved print job.

In step S409, the CPU 111 sets and updates the reserved print job timer with the earliest print start date and time among those of the reserved print jobs included in the updated reserved print job list.

Figure 5:
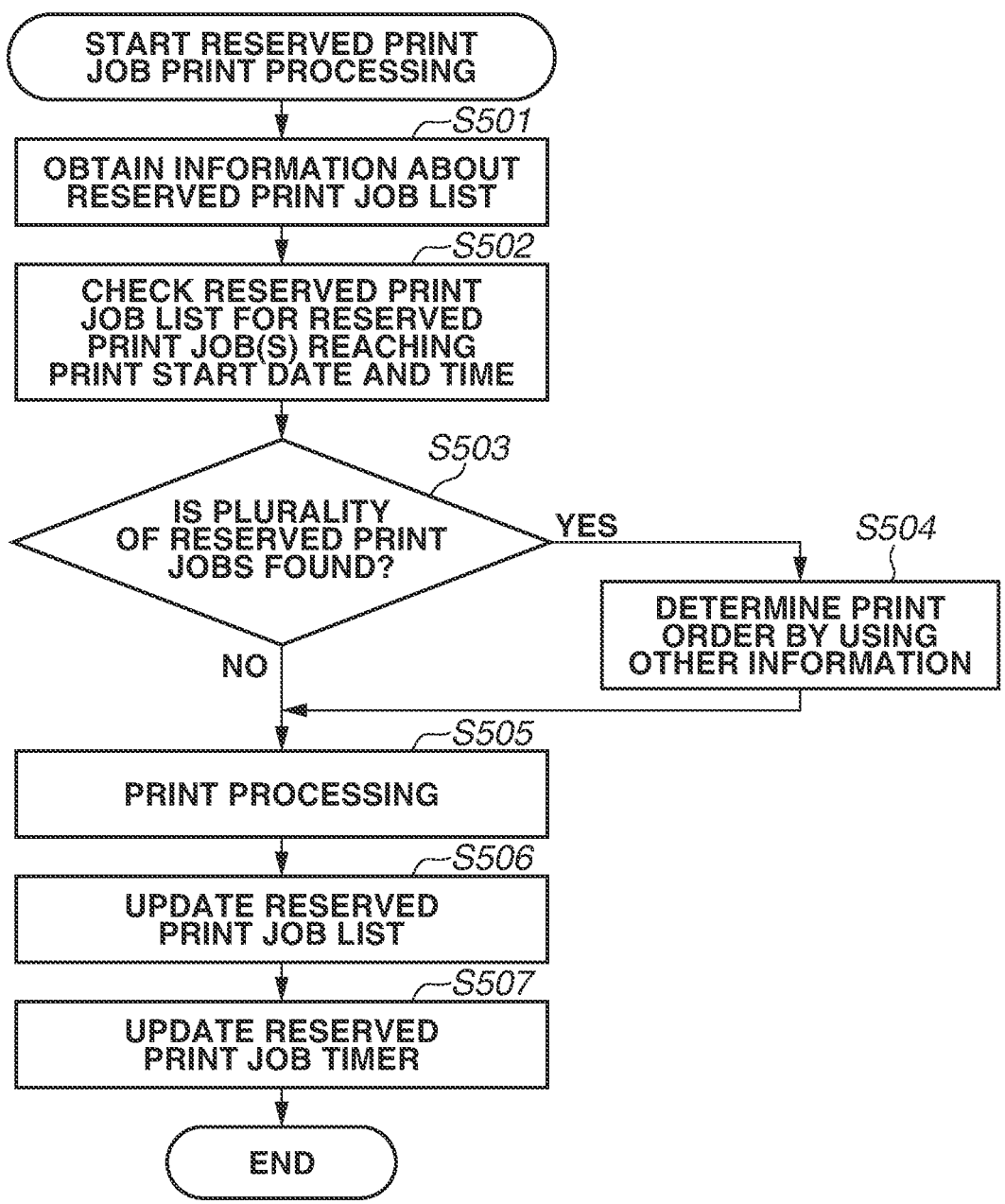
FIG. 5 is a flowchart illustrating a processing procedure of reserved print job print processing according to the first exemplary embodiment of the present invention.

FIG. 5 is a flowchart illustrating reserved print job print processing of the printing apparatus 100. For example, the processing of FIG. 5 is implemented by the CPU 111 reading a program stored in the ROM 112 into the RAM 113 and executing the program. The processing of FIG. 5 is started when the current date and time reaches the date and time of the reserved print job timer set in step S309 or S409. The date and time of the reserved print job timer may exceed the current date and time while the printing apparatus 100 is powered off. In such a case, the processing is started when the printing apparatus 100 is powered on.

In step S501, the CPU 111 obtains the information about the reserved print job list stored in the storage device 150 in step S308. The following description will be given on the assumption that the information about the reserved print job list of FIG. 9 is obtained here.

In step S502, the CPU 111 checks the reserved print job list obtained in step S501 for a reserved print job or jobs reaching the start date and time.

In step S503, the CPU 111 checks whether a plurality of reserved print jobs is found in step S502. If a plurality of reserved print jobs is found (YES in step S503), the processing proceeds to step S504. If only one reserved print job is found (NO in step S503), the processing proceeds to step S505.

In step S504, the CPU 111 determines print order of the reserved print jobs. If there are reserved print jobs coinciding in the print start date and time, the print order of such reserved print jobs is determined according to the same rule as that used in determining the display order of the reserved print job list in step S404 of FIG. 4. In other words, the display order of the reserved print job list is the same as the order of printing.

In step S505, the CPU 111 adds the reserved print job(s) found in step S502 to the print processing execution waiting print job list in the RAM 113 according to the print order determined in step S504. The CPU 111 then waits until the processing of a preceding print job is ended and the CPU 111 becomes ready to start printing, if the CPU 111 is ready to start printing, the CPU 111 interprets print data read from the storage device 150 to generate an image, and passes generated image data to the printer device 130. The printer device 130 performs print processing by forming an image on a recording medium, such as a sheet, based on the received image data. The CPU 111 deletes the reserved print job of which the print processing is completed from the print processing execution waiting print job list in the RAM 113, and deletes the print data of the reserved print job from the storage device 150.

In step S506, the CPU 111 deletes the reserved print job deleted in step S505 from the reserved print job list.

In step S507, the CPU 111 sets and updates the reserved print job timer with the earliest print start date and time among those of the reserved print jobs in the reserved print job list of step S506. The present processing is ended.

As described above, if the printing apparatus 100 according to the present exemplary embodiment receives print data having a specified print time from an external apparatus, the printing apparatus 100 stores the print data. When the specified print time comes, the printing apparatus 100 performs print processing based on the print data. In displaying a list of a plurality of pieces of print data stored, the printing apparatus 100 determines the display order (order of arrangement) based on their print times. The user can thus easily identify in what order the pieces of print data are printed. If there is a plurality of pieces of print data having the same print time, the display order is determined based on other information such as a job ID. Since the display order determined here is the same as the order of printing, the user can check the list to see in what order printing is performed, even if there is a plurality of pieces of print data having the same print time. In addition, the user is allowed to set the order of display and printing, so that the print order can be controlled according to the user's use environment.

A second exemplary embodiment will be described below with regard to differences from the first exemplary embodiment.

Figure 6:
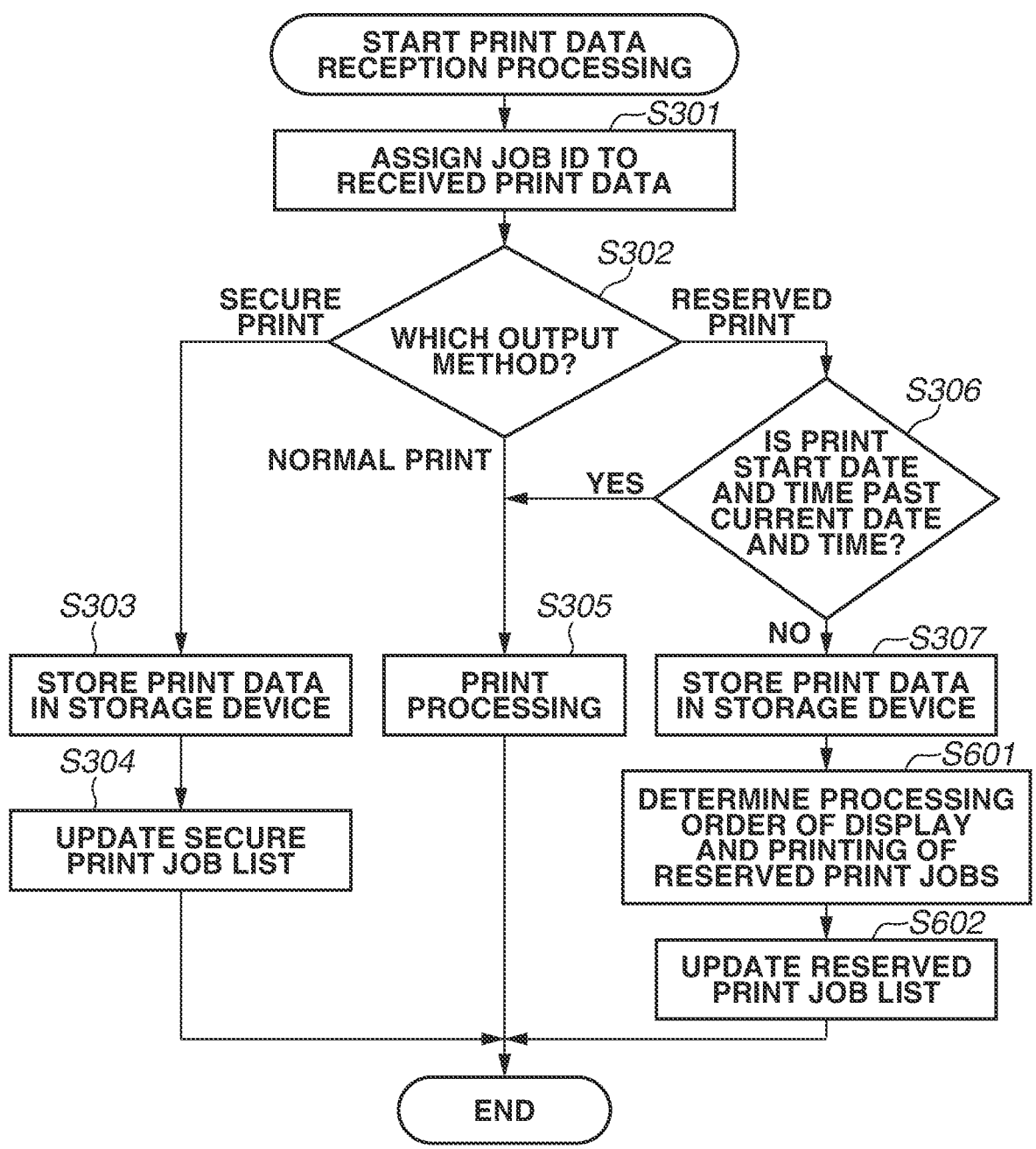
FIG. 6 is a flowchart illustrating a processing procedure of print data reception processing according to the second and third exemplary embodiments of the present invention.

FIG. 6 is a flowchart illustrating print data reception processing of the printing apparatus 100, For example, the processing of FIG. 6 is implemented by the CPU 111 reading a program stored in the ROM 112 into the RAM 113 and executing the program. The processing of FIG. 6 is started when the printing apparatus 100 receives the print data transmitted from the HC 191 in step S207 of FIG. 2. Processing similar to that of FIG. 3 described in the first exemplary embodiment will be designated by the same numerals, A detailed description thereof will be omitted.

In step S601, the CPU 111 obtains information needed to determine processing order of display and printing from the print data stored in the storage device 150 in step S307, and determines the processing order of display and printing of the reserved print jobs.

Figure 14:
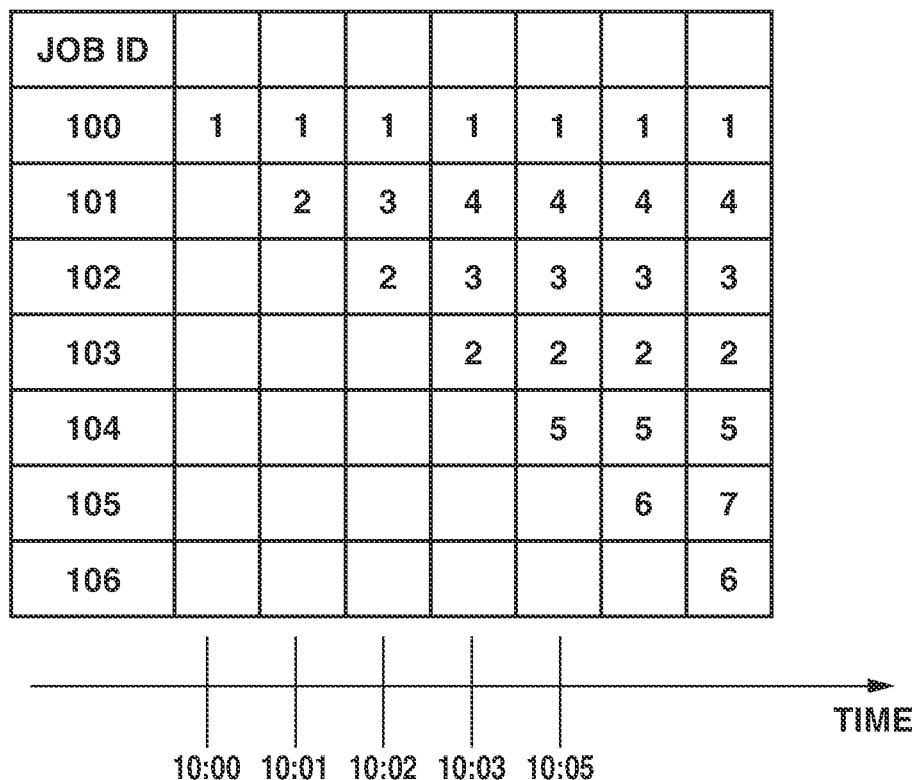
FIG. 14 illustrates an example of processing order of display and printing according to the second exemplary embodiment of the present invention.

FIG. 14 illustrates a flow of processing for determining the processing order. If there are reserved print jobs coinciding in the print start date and time, such reserved print jobs are processed according to the order of priority of rule D described in FIG. 12. As illustrated in FIG. 14, the processing order of display and printing is determined each time a new piece of print data is received.

In step S602, the CPU 111 updates the reserved print job list based on information about the processing order determined in step S601, and stores the information about the reserved print job list into the storage device 150.

FIG. 13 illustrates an example of the reserved print job list. As compared with the reserved print job list of FIG. 9 described in the first exemplary embodiment, processing order 1301 determined in step S601 is stored in the reserved print job list.

Figure 7:
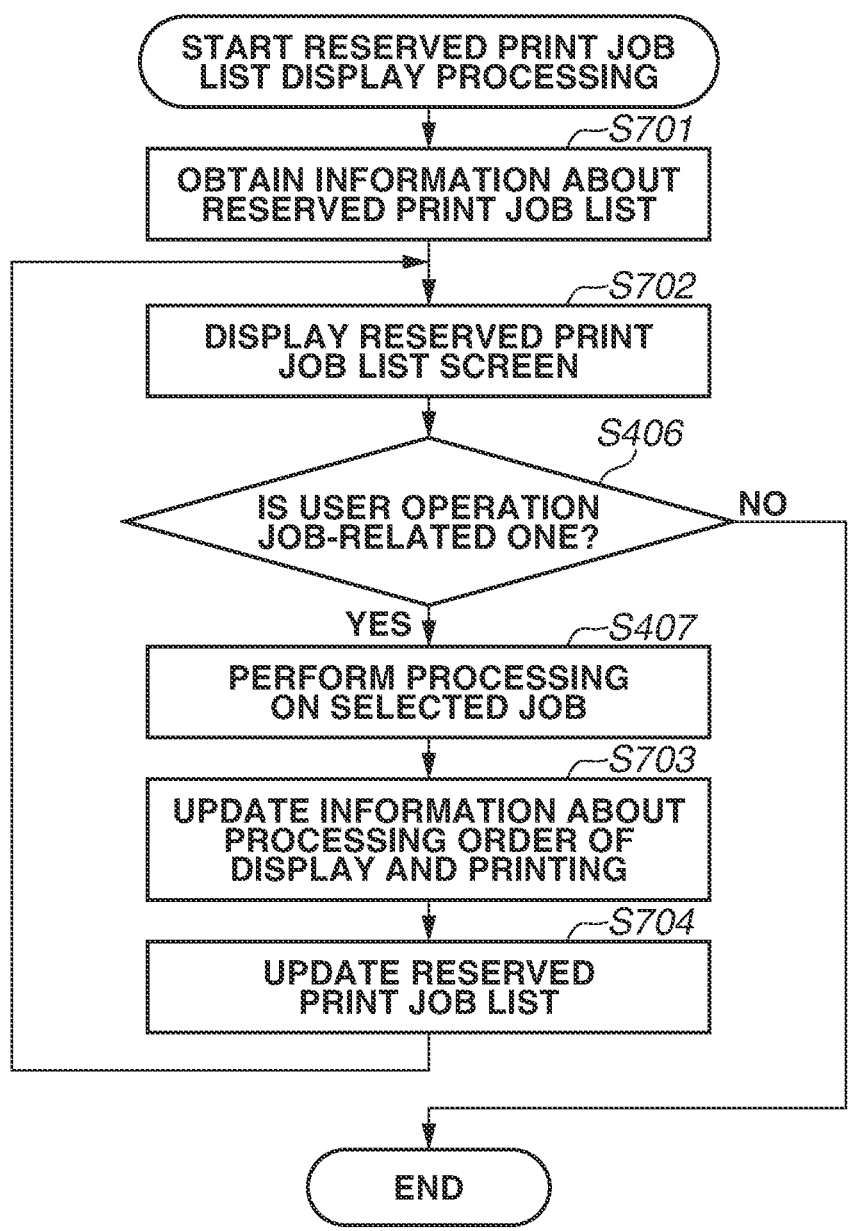
FIG. 7 is a flowchart illustrating a processing procedure of reserved print job list display processing according to the second exemplary embodiment of the present invention.

FIG. 7 is a flowchart illustrating reserved print job list display processing of the printing apparatus 100. For example, the processing of FIG. 7 is implemented by the CPU 111 reading a program stored in the ROM 112 into the RAM 113 and executing the program. The processing of FIG. 7 is started by the user giving an instruction to start the present processing via the operation unit 140. Processing similar to that of FIG. 4 described in the first exemplary embodiment will be designated by the same numerals. A detailed description thereof will be omitted.

In step S701, the CPU 111 obtains the information about the reserved print job list stored in the storage device 150 in step S602. The following description will be given on the assumption that the information about the reserved print job list of FIG. 13 is obtained here.

In step S702, the CPU 111 displays a reserved print job list screen on the liquid crystal panel of the operation unit 140 based on the reserved print job list obtained in step S701. Here, the CPU 111 displays the reserved print jobs according to the processing order 1301 of the reserved print job list.

In step S703, the CPU 111 updates information about the processing order of display and printing according to the content of the processing performed in step S407, such as a change of the print start date and time and deletion of the reserved print job.

In step S704, the CPU 111 updates the contents of the reserved print job list according to the content of the processing performed in step S407, such as a change of the print start date and time and deletion of the reserved print job.

Figure 8:
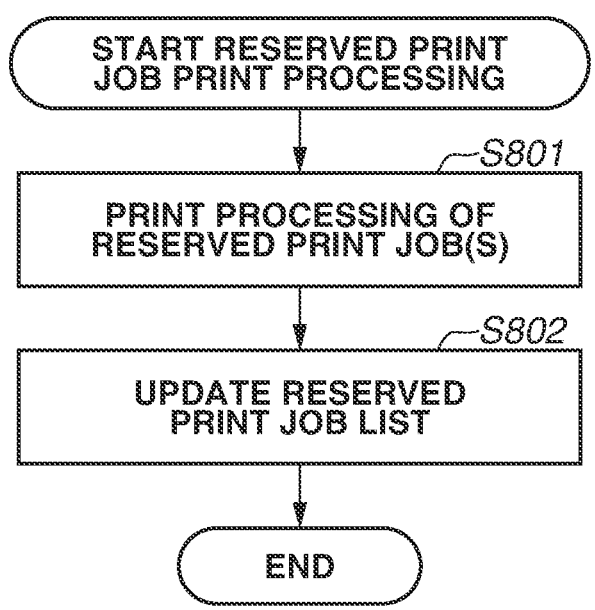
FIG. 8 is a flowchart illustrating a processing procedure of reserved print job print processing according to the second exemplary embodiment of the present invention.

FIG. 8 is a flowchart illustrating reserved print job print processing of the printing apparatus 100. For example, the processing of FIG. 8 is implemented by the CPU 111 reading a program stored in the ROM 112 into the RAM 113 and executing the program. The processing of FIG. 8 is started when the current date and time reaches the print start date and time of the reserved print job that is the earliest in the processing order determined in step S601 or S703. The print start date and time of the reserved print job may exceed the current date and time while the printing apparatus 100 is powered off. In such a case, the processing is started when the printing apparatus 100 is powered on.

In step S801, the CPU 111 adds a reserved print job or jobs of which the print start date and time reaches the current date and time to the print processing execution waiting print job list in the RAM 113, in the processing order determined in step S601 or S703 starting with the earliest one. The CPU 111 then waits until the processing of a preceding print job ends and the CPU 111 becomes ready to start printing. If the CPU 111 is ready to start printing, the CPU 111 interprets print data read from the storage device 150 to generate an image, and passes generated image data to the printer device 130. The printer device 130 performs print processing by forming an image on a recording medium, such as a sheet, based on the received image data. The CPU 111 deletes the reserved print job(s) of which the print processing is completed from the print processing execution waiting print job list in the RAM 113, and deletes the print data from the storage device 150.

In step S802, the CPU 111 deletes the reserved print job(s) deleted in step S801 from the reserved print job list. The present processing ends.

The print processing here is started based on the information about the processing order. To speed up the determination, information about the earliest one in the processing order may be stored. Like the first exemplary embodiment, a reserved print job timer may be used.

As described above, the printing apparatus 100 according to the second exemplary embodiment determines the display order and the print order of print data each time a piece of print data is received. The printing apparatus 100 therefore does not need to determine the processing order again when displaying a print data list or when performing printing.

A third exemplary embodiment will be described below with regard to differences from the first and second exemplary embodiments. In the first and second exemplary embodiments, the reserved print job list and the secure print job list are described to be separately managed so that the lists are not displayed in a mixed manner. A third exemplary embodiment describes an example in which a plurality of such lists, including the print processing execution waiting print job list, is collectively displayed as an integrated print job list.

FIG. 20 is a flowchart illustrating integrated print job list display processing of the printing apparatus 100. For example, the processing of FIG. 20 is implemented by the CPU 111 reading a program stored in the ROM 112 into the RAM 113 and executing the program. The processing of FIG. 20 is started by the user giving an instruction to start the present processing via the operation unit 140.

In step S2001, the CPU 111 obtains all the print job lists stored in the printing apparatus 100. The CPU 111 obtains the print processing execution waiting print job list generated in step S305, the secure print job list generated in step S304, and the reserved print job list generated in step S602. The following description will be given on the assumption that the information about the reserved print job list of FIG. 9 is obtained as the reserved print job list.

In step S2002, the CPU 111 generates an integrated print job list by merging the print job lists obtained in step S2001, and sorts the display order so that print jobs having earlier print start dates and times are displayed first.

In step S2003, the CPU 111 displays an integrated print job list screen on the liquid crystal panel of the operation unit 140 based on the integrated print job list in which the display order is sorted in step S2002.

FIG. 19 illustrates an example of the integrated print job list screen. An integrated print job list screen 1901 displays a job display area 1902, checkboxes 1903, a close button 1904, and a job deletion button 1905. The job display area 1902 displays information need for the user to determine the content of print jobs, such as a job name, and a processing status of each job. The display areas of the items related to the respective jobs in the job display area 1902 have the role of a selection button for selecting the jobs. If the user selects a job, a corresponding checkbox 1903 is checked and display is switched so that the selected job can be identified. In the example of FIG. 19, two pieces of print data are submitted as normal print jobs. Of these, reference material A being printed is displayed at the top, and reference material B next to be printed is displayed on the second row. Reserved print jobs are displayed on the third and subsequent rows. A secure print job is not printed until a print instruction is given by the user. Since its print start time is unable to be identified, the secure print job is displayed at the bottom. This is just an example of display, and other job-related contents may be displayed. Anonymization may be performed in a user authentication environment.

In step S2004, the CPU 111 accepts the user's operation via the operation unit 140. If an operation on the job deletion button 1905 is accepted (YES in step S2004), the processing proceeds to step S2005. If an operation for closing the integrated print job list screen, made by the close button 1904 is accepted (NO in step S2004), the present processing ends.

In step S2005, the CPU 111 deletes the print data of the selected print job, stored in the storage device 150 or the RAM 113, and deletes the selected print job from the corresponding print job list. If the selected print job is being printed, the CPU 111 aborts the print processing and then performs the deletion processing.

According to the third exemplary embodiment, the display order is thus determined based on the print times even if a plurality of print jobs of different output methods is collectively listed. The user can thus easily identify in that order the print jobs are printed.

As descried above, according to the foregoing exemplary embodiments, the user can easily identify the starting order of printing by the printing apparatus 100 which receives pieces of print data having specified print times from outside and performs printing based on the print data according to the specified print times.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195482, filed Oct. 5, 2017, which is hereby incorporated by reference herein in its entirety.

What is claimed is:

1. A printing apparatus comprising:
a memory storing instructions; and
a processor executing the instructions to:
receive, from at least one external apparatus, a plurality of reserved print jobs including information about a print start time specified by a user operation on the external apparatus;
store the received reserved print jobs including the information about the specified print start time in a storage device;
display a plurality of reserved print jobs stored in the storage device in order of arrangement determined based on the print start time specified by the user operation on the external apparatus and storing time indicating time on storing a reserved print job in the storage device, wherein the plurality of reserved print jobs are displayed in order of arrangement determined prioritizing the print start time over the storing time, and display each of the reserved print jobs together with at least information for specifying the reserved print jobs and the information about the print start time specified by the user operation on the external apparatus; and
perform print control so that printing based on the reserved print jobs stored in the storage device is performed according to the order of arrangement.

2. The printing apparatus according to claim 1, wherein, if there is a plurality of reserved print jobs having the same print start time, an order of arrangement of the plurality of reserved print jobs having the same print start time is determined based on storing time indicating time on storing the plurality of reserved print jobs in the storage device.

3. The printing apparatus according to claim 2, wherein the information indicating the order of reception of the reserved print jobs includes a job identifier (ID) assigned according to the reception of the reserved print jobs.

4. The printing apparatus according to claim 2, wherein the other information includes information identified from a username included in the reserved print jobs.

5. The printing apparatus according to claim 1, wherein the printing is performed in the order of the plurality of print jobs displayed.

6. The printing apparatus according to claim 1, wherein the instructions further cause the printing apparatus to set a timer for an earliest print start time among the print start times of the plurality of reserved print jobs stored in the storage device, wherein, when the time for which the timer is set is reached, the printing is controlled to start based on a reserved print job including the information about the specified print start time.

7. The printing apparatus according to claim 1, wherein, if the print start time of a received reserved print job is past the current time, the printing is not performed based on the reserved print job.

8. The printing apparatus according to claim 1, wherein print data of which printing is completed is deleted from the storage device.

9. The printing apparatus according to claim 1, wherein the information about the print start time of each of the reserved print jobs is displayed.

10. The printing apparatus according to claim 1, wherein the instructions further cause the printing apparatus to determine an order of arrangement of a plurality of reserved print jobs stored in the storage device based on the print start time specified by the user operation on the external apparatus and storing time indicating time on storing a reserved print job in the storage device, wherein the order of arrangement of a plurality of reserved print jobs is determined prioritizing the print start time over the storing time.

11. A method for controlling a printing apparatus, the method comprising:

receiving, from at least one external apparatus, a plurality of reserved print jobs including information about a print start time specified by a user operation on the external apparatus;

storing the received reserved print jobs including the information about the specified print start time in a storage device;

displaying a plurality of reserved print jobs stored in the storage device in order of arrangement determined based on the print start time specified by the user operation on the external apparatus and storing time indicating time on storing a reserved print job in the storage device, wherein the plurality of reserved print jobs are displayed in order of arrangement determined prioritizing the print start time over the storing time, and displaying each of the reserved print jobs together with at least information for specifying the reserved print jobs and the information about the print start time specified by the user operation on the external apparatus; and performing control so that printing based on the reserved print jobs stored in the storage device is performed according to the order of arrangement.

12. A non-transitory computer readable storage medium storing a program for causing a computer to perform a method for controlling a printing apparatus, the method comprising:

receiving, from at least one external apparatus, a plurality of reserved print jobs including information about a print start time specified by a user operation on the external apparatus;

storing the received reserved print jobs including the information about the specified print start time in a storage device;

displaying a plurality of reserved print jobs stored in the storage device in order of arrangement determined based on the print start time specified by the user operation on the external apparatus and storing time indicating time on storing a reserved print job in the storage device, wherein the plurality of reserved print jobs are displayed in order of arrangement determined prioritizing the print start time over the storing time, and displaying each of the reserved print jobs together with at least information for specifying the reserved print jobs and the information about the print start time specified by the user operation on the external apparatus; and performing control so that printing based on the reserved print jobs stored in the storage device is performed according to the order of arrangement.

* * * * *